(12) United States Patent
Wang (10) Patent No.: US 12,010,530 B2
(45) Date of Patent: Jun. 11, 2024

(54) PDCP DUPLICATION FUNCTION DETERMINATION AND INDICATION METHODS AND DEVICES, BASE STATION, AND TERMINAL

(71) Applicant: SPREADTRUM COMMUNICATIONS (SHANGHAI) CO., LTD., Shanghai (CN)

(72) Inventor: Tingting Wang, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 513 days.

(21) Appl. No.: 17/288,731

(22) PCT Filed: Oct. 17, 2019

(86) PCT No.: PCT/CN2019/111610
§ 371 (c)(1),
(2) Date: Apr. 26, 2021

(87) PCT Pub. No.: WO2020/083086
PCT Pub. Date: Apr. 30, 2020

(65) Prior Publication Data
US 2021/0400503 A1 Dec. 23, 2021

(30) Foreign Application Priority Data
Oct. 26, 2018 (CN) .......................... 201811261176.7

(51) Int. Cl.
H04W 24/02 (2009.01)
H04W 28/06 (2009.01)
(Continued)

(52) U.S. Cl.
CPC ........... *H04W 24/02* (2013.01); *H04W 28/06* (2013.01); *H04W 28/16* (2013.01); *H04W 80/02* (2013.01)

(58) Field of Classification Search
CPC ..... H04W 24/02; H04W 28/06; H04W 28/16; H04W 80/02
See application file for complete search history.

(56) References Cited

U.S. PATENT DOCUMENTS

| 2010/0145171 A1 | 6/2010 | Park |
| 2016/0057585 A1 | 2/2016 | Horn et al. |

(Continued)

FOREIGN PATENT DOCUMENTS

| CN | 108370304 A | 8/2018 |
| CN | 108401484 A | 8/2018 |

(Continued)

OTHER PUBLICATIONS

International Search Report for International Application No. PCT/CN2019/111610; dated Jan. 21, 2020.
(Continued)

*Primary Examiner* — Siming Liu
(74) *Attorney, Agent, or Firm* — CANTOR COLBURN LLP (57) ABSTRACT

PDCP duplication function determination and indication methods and devices, a base station, and a terminal. Said determination method comprises: receiving PDCP duplication function configuration information sent by a network, the PDCP duplication function configuration information being obtained by determining, when an RB is configured with a PDCP duplication function, and on the basis of the number of priority levels of data packets of the RB, whether the data packets associated with each priority level are configured with the PDCP duplication function; and deter- (Continued)

--- receiving a PDCP duplication function configuration information sent by a network, where the PDCP duplication function configuration information is obtained by determining, when a RB is configured with a PDCP duplication function, whether data packets associated with each priority level are configured with the PDCP duplication function based on a number of priority levels of data packets of the RB — S101 determining, according to the PDCP duplication function configuration information, whether each data packet of the RB is configured with the PDCP duplication function — S102 mining, according to the PDCP duplication function configuration information, whether each data packet of the RB is configured with the PDCP duplication function. With the technical solution provided by the present invention, user equipment can be effectively and flexibly configured with a PDCP duplication function, improving the utilization efficiency of transmission resources.

19 Claims, 5 Drawing Sheets

(51) Int. Cl.
　　　*H04W 28/16*　　　(2009.01)
　　　*H04W 80/02*　　　(2009.01)

(56) References Cited

U.S. PATENT DOCUMENTS

| | | |
|---|---|---|
| 2019/0098640 A1 | 3/2019 | Holakouei et al. |
| 2020/0100317 A1 | 3/2020 | Jiang |
| 2020/0187297 A1 | 6/2020 | Jiang |
| 2020/0213045 A1* | 7/2020 | Lee .................. H04L 69/322 |

FOREIGN PATENT DOCUMENTS

| | | |
|---|---|---|
| CN | 108401505 A | 8/2018 |
| WO | 2017182927 A1 | 10/2017 |
| WO | 2018170891 A1 | 9/2018 |

OTHER PUBLICATIONS

Potevio, "Packet Duplication for eV2X Side link CA", 3rd Generation Partnership Project, 3GPP TSG-RAN WG2 #100 , Dated (Dec. 1, 2017) R2-1712970; 3 pages.

Sharp, "PDCP Duplication in CA", 3rd Generation Partnership Project, 3GPP TSG-RAN2 ADhoc Meeting, Qindao, China, Jun. 27-29, 2017; R2-1706791; 6 pages.

EPO Extended European Search Report for corresponding EP Application No. 19876376.5; dated Jun. 9, 2022.

Sequans Communications, "BSR operation with CA packet duplication", 3GPP TSG-RAN WG2 Meeting #103bis, R2-1815180, Oct. 8-12, 2018; 3 pages.

Spreadtrum Communications, "Discussion on BSR triggering enhancement in case of PDCP CA duplication", 3GPP TSG-RAN WG2 meeting #102, R2-1807070, May 21-25, 2018; 5 pages.

* cited by examiner

```
┌─────────────────────────────────────────────────────────────┐
│ receiving a PDCP duplication function configuration information sent by a │
│ network, where the PDCP duplication function configuration information is │
│ obtained by determining, when a RB is configured with a PDCP duplication  │  S101
│ function, whether data packets associated with each priority level are    │
│ configured with the PDCP duplication function based on a number of        │
│ priority levels of data packets of the RB                                 │
└─────────────────────────────────────────────────────────────┘
                                 │
┌─────────────────────────────────────────────────────────────┐
│ determining, according to the PDCP duplication function configuration │
│ information, whether each data packet of the RB is configured with the │  S102
│ PDCP duplication function                                              │
└─────────────────────────────────────────────────────────────┘
```

PDCP DUPLICATION FUNCTION DETERMINATION AND INDICATION METHODS AND DEVICES, BASE STATION, AND TERMINAL

CROSS-REFERENCE TO RELATED APPLICATIONS

This is the U.S. national stage of application No. PCT/CN2019/111610, filed on Oct. 17, 2019. Priority under 35 U.S.C. § 119(a) and 35 U.S.C. § 365(b) is claimed from Chinese Application No. 201811261176.7, filed on Oct. 26, 2018, the disclosure of which is also incorporated herein by reference.

TECHNICAL FIELD

The present disclosure generally relates to wireless communication technology field, and more particularly, to PDCP duplication function determination and indication methods and devices, a base station and a terminal.

BACKGROUND

The Fifth-Generation mobile communications (5G) New Radio (NR) has introduced Packet Data Convergence Protocol (PDCP) duplication.

In prior art, PDCP duplication includes two types: Carrier Aggregation (CA) duplication and Dual Connectivity (DC) duplication. The main purpose of both CA duplication and DC duplication is to improve reliability of Ultra Reliable Low Latency Communications (URLLC) transmission and reduce transmission delay. PDCP duplication duplicates a PDCP protocol data unit (PDU) and gets two identical PDCP PDUS at a PDCP layer of a transmitter and sends the two identical PDCP PDUS to two different Radio Link Controller (RLC) entities. If the two identical PDCP PDUs are successfully received by a PDCP layer of a receiver, one PDCP PDU is deleted and the other one is retained. In other words, a same packet is duplicated into two identical packets and the two identical packets are transmitted through two different legs, so as to improve data transmission reliability.

In the prior art, PDCP duplication is configured with a Radio Bearer (RB) as granularity. Once the RB is configured with PDCP duplication function, all data packets in the RB conduct PDCP duplication when the PDCP duplication function is activated. In the 81st meeting of Radio Access Network working group 1 (RAN1 #81), research objectives of NR industrial Internet of things were detailed and modified, which include improving data duplication and multi-connectivity technology. Therefore, enhancing PDCP duplication and improving utilization efficiency of transmission resources are very important.

SUMMARY

Embodiments of the present disclosure provide a solution of how to flexibly and effectively configure PDCP duplication, so as to improve utilization efficiency of transmission resources.

In an embodiment of the present disclosure, a PDCP duplication function determination method is provided, including: receiving a PDCP duplication function configuration information sent by a network, where the PDCP duplication function configuration information is obtained by determining, when a Radio Bearer (RB) is configured with a PDCP duplication function, whether data packets associated with each priority level are configured with the PDCP duplication function based on a number of priority levels of data packets of the RB; and determining, according to the PDCP duplication function configuration information, whether each data packet of the RB is configured with the PDCP duplication function.

Optionally, the priority levels of the data packets are determined in a following way: determining the priority levels of the data packets according to Quality of Service (QoS) flow identifiers (IDs) of the data packets; or determining the priority levels of the data packets according to an indication from an upper layer of the data packets.

Optionally, determining the priority levels of the data packets according to an indication from an upper layer of the data packets includes: determining the priority levels of the data packets according to importance identifiers or priority level identifiers carried in the data packets, or according to a header information of the upper layer of the data packets.

Optionally, determining whether each data packet of the RB is configured with the PDCP duplication function according to the PDCP duplication function configuration information includes: determining a priority level of each data packet of the RB; and if the PDCP duplication function configuration information uses a bitmap to indicate whether data packets associated with each priority level are configured with the PDCP duplication function, determining whether each data packet is configured with the PDCP duplication function according to the priority level of the data packet.

Optionally, determining whether each data packet of the RB is configured with the PDCP duplication function according to the PDCP duplication function configuration information includes: determining a priority level of each data packet of the RB; and when the PDCP duplication function configuration information indicates a number of priority levels of data packets configured with the PDCP duplication function, determining whether each data packet is configured with the PDCP duplication function according to the priority level of the data packet and the number of priority levels.

Optionally, determining whether each data packet of the RB is configured with the PDCP duplication function according to the PDCP duplication function configuration information includes: determining a priority level of each data packet of the RB; and when the PDCP duplication function configuration information uses a bitmap to indicate at least one leg used by data packets associated with each priority level, determining whether each data packet is configured with the PDCP duplication function according to the priority level of the data packet and the at least one leg used by the data packets associated with the priority level.

Optionally, determining whether each data packet is configured with the PDCP duplication function according to the priority level of the data packet and the at least one leg used by the data packets associated with the priority level includes: when a number of the at least one leg used by the data packets associated with the priority level is greater than or equal to 1, determining a leg used by the data packet according to the priority level of the data packet and the at least one leg used by the data packets associated with the priority level.

Optionally, determining whether each data packet of the RB is configured with the PDCP duplication function according to the PDCP duplication function configuration information includes: determining a priority level of each data packet of the RB; and when the PDCP duplication function configuration information indicates a number of legs used by data packets of each priority level configured with the PDCP duplication function, determining whether each data packet is configured with the PDCP duplication function according to the priority level of the data packet and the number of legs.

Optionally, priority levels of legs used for the PDCP duplication function corresponding to the RB are predetermined, and determining whether each data packet is configured with the PDCP duplication function according to the priority level of the data packet and the number of legs includes: when the number of legs used by the data packets associated with the priority level is greater than or equal to 1, determining whether each data packet is configured with the PDCP duplication function according to the priority level of the data packet, the number of legs and the priority levels of legs.

In an embodiment of the present disclosure, a PDCP duplication function indication method is provided, including: determining whether to configure a PDCP duplication function for a Radio Bearer (RB); when the PDCP duplication function is configured for the RB, determining a number of priority levels of data packets of the RB; according to the number of priority levels, determining whether data packets associated with each priority level are configured with the PDCP duplication function, so as to obtain a PDCP duplication function configuration information; and sending the PDCP duplication function configuration information to a user equipment (UE).

Optionally, the priority levels of the data packets are determined in a following way: determining the priority levels of the data packets according to Quality of Service (QoS) flow identifiers (IDs) of the data packets; or determining the priority levels of the data packets according to an indication from an upper layer of the data packets.

Optionally, determining the priority levels of the data packets according to an indication from an upper layer of the data packets includes: determining the priority levels of the data packets according to importance identifiers or priority level identifiers carried in the data packets, or according to a header information of the upper layer of the data packets.

Optionally, the PDCP duplication function configuration information uses a bitmap to indicate whether data packets associated with each priority level are configured with the PDCP duplication function.

Optionally, while determining whether data packets associated with each priority level are configured with the PDCP duplication function, the PDCP duplication function indication method further includes: determining a configuration indication information, wherein the configuration indication information indicates a number of priority levels of the data packets configured with the PDCP duplication function, so that the UE determines whether the data packets associated with each priority level are configured with the PDCP duplication function according to the number of priority levels, where the PDCP duplication function configuration information includes the configuration indication information.

Optionally, while determining whether data packets associated with each priority level are configured with the PDCP duplication function, the PDCP duplication function indication method further includes: determining a leg indication information, wherein the leg indication information indicates legs used by the data packets configured with the PDCP duplication function associated with each priority level, where the PDCP duplication function configuration information includes the leg indication information.

Optionally, priority levels of legs used for the PDCP duplication function corresponding to the RB are predetermined, and while determining whether data packets associated with each priority level are configured with the PDCP duplication function, the PDCP duplication function indication method further includes: determining a leg indication information, wherein the leg indication information indicates a number of legs used by the data packets associated with each priority level configured with the PDCP duplication function, so that the UE determines legs used by the data packets configured with the PDCP duplication function according to the number of legs and the priority levels of legs, wherein the PDCP duplication function configuration information includes the leg indication information.

In an embodiment of the present disclosure, a PDCP duplication function determination device is provided, including: a receiving module, adapted to receive a PDCP duplication function configuration information sent by a network, where the PDCP duplication function configuration information is obtained by determining, when a Radio Bearer (RB) is configured with a PDCP duplication function, whether data packets associated with each priority level are configured with the PDCP duplication function based on a number of priority levels of data packets of the RB; and a determining module, adapted to determine whether each data packet of the RB is configured with the PDCP duplication function according to the PDCP duplication function configuration information.

In an embodiment of the present disclosure, a PDCP duplication function indication device is provided, including: a first determining module, adapted to determine whether to configure a PDCP duplication function for a Radio Bearer (RB); a second determining module, adapted to, when the PDCP duplication function is configured for the RB, determine a number of priority levels of data packets of the RB; a third determining module, adapted to, according to the number of priority levels, determine whether data packets associated with each priority level are configured with the PDCP duplication function, so as to obtain a PDCP duplication function configuration information; and a sending module, adapted to send the PDCP duplication function configuration information to a user equipment (UE).

In an embodiment of the present disclosure, a storage medium having computer instructions stored therein is provided, wherein once the computer instructions are executed, the above PDCP duplication function determination method or the above PDCP duplication function indication method is performed.

In an embodiment of the present disclosure, a terminal including a memory and a processor is provided, wherein the memory has computer instructions stored therein, and when the processor executes the computer instructions, the above method is performed.

In an embodiment of the present disclosure, a base station including a memory and a processor is provided, wherein the memory has computer instructions stored therein, and when the processor executes the computer instructions, the above method is performed.

Embodiments of the present disclosure may provide following advantages.

In embodiments of the present disclosure, the PDCP duplication function determination method is provided, including: receiving a PDCP duplication function configuration information sent by a network, where the PDCP duplication function configuration information is obtained by determining, when an RB is configured with a PDCP duplication function, whether one or more data packets associated with each priority level are configured with the PDCP duplication function based on a number of priority levels of data packets of the RB; and determining, according to the PDCP duplication function configuration information, whether each data packet of the RB is configured with the PDCP duplication function. According to the embodiments of the present disclosure, the PDCP duplication function can be configured for the data packets according to the priority levels of the data packets in each RB, so that the granularity of the PDCP duplication function configuration is refined, which facilitates the network to effectively and flexibly configure the PDCP duplication function for the data packets based on the priority levels of the data packets. Furthermore, according to the embodiments of the present disclosure, the PDCP duplication function determination method facilitates the network to configure the PDCP duplication function for certain data packets in the RB according to current transmission resources, wireless link transmission quality and other related factors, thereby improving utilization efficiency of transmission resources.

Further, the priority levels of the data packets are determined according to QoS flow identifiers of the data packets or according to an indication from an upper layer of the data packets. According to the embodiments of the present disclosure, the priority levels of the data packets can be sorted, which is beneficial to realize the PDCP duplication function based on the importance/priority levels of the data packets.

DETAILED DESCRIPTION

As described in background, PDCP duplication function is not configured flexibly and effectively in the prior art.

Specifically, PDCP duplication includes two types in the prior art: CA duplication and DC duplication.

In a CA scenario, CA duplication configures PDCP duplication for each radio bearer (RB) through a Radio Resource Control (RRC) message. When a user equipment (UE) adopts PDCP duplication, an additional RLC entity may be established for the RB. The RRC message may also indicate a cell group identifier and a logical channel identifier (LCID) of a primary RLC entity. The RRC message may also set an initial state (for example, active or inactive) for the RB. PDCP duplication in the CA scenario corresponds to a Medium Access Control (MAC) entity. In addition, the RRC message may also be configured with two logical channels (LCH) (also known as being configured with two RLC entities) which are mapped to different carriers.

PDCP duplication needs to be activated after being configured by the RRC message. The activation and deactivation of PDCP duplication is realized through activation/deactivation of a MAC control element (CE) of a base station (for example, a gNB). The MAC CE includes bitmap information, and each bit in the bitmap information corresponds to a Data RB (DRB) configured with PDCP duplication function. When a bit corresponding to a DRB is 1, the DRB is activated; when a bit corresponding to a DRB is 0, the DRB is deactivated.

After a DRB is activated, a PDCP layer will duplicate a data packet to get two identical PDCP PDUs and send the two identical PDCP PDUs to two RLC entities corresponding to the DRB, and the two RLC entities will send the two identical PDCP PDUs respectively.

After PDCP duplication of the DRB is deactivated, the corresponding relationship between a LCH corresponding to the DRB and a carrier is terminated. The PDCP layer of the UE no longer duplicates packets, and a primary RLC entity (that is, a primary LCH) sends the packets. A PDCP entity of the UE informs a secondary RLC entity to delete packets cached in the secondary LCH.

In a DC scenario, PDCP duplication takes a split bearer as a baseline for duplication operations. Similar to the CA scenario, PDCP duplication can only be performed after a RRC signaling is configured and activated. The activation and deactivation of PDCP duplication is realized through activation/deactivation of a MAC CE of a base station (for example, a gNB). The MAC CE also includes a bitmap information, and each bit in the bitmap information corresponds to a DRB configured with PDCP duplication function. A mapping relationship between DRBs and the bitmap is based on a DRB ID with duplication function. When a bit corresponding to a DRB is 1, PDCP duplication of the DRB is activated; when a bit corresponding to a DRB is 0, PDCP duplication of the DRB is deactivated.

After a DRB is activated, a PDCP entity will duplicate a data packet to get two identical PDCP PDUs and send the two identical PDCP PDUs to two RLC entities corresponding to the DRB, and the two RLC entities will send the two identical PDCP PDUs respectively.

After the DRB is deactivated, the UE adopts a split operation again and uses a relevant parameter of an initial split operation to perform the split operation.

In the Release 15 (R15) version of the NR protocol, for each RB, a configuration information of PDCP duplication includes the following information:

(1) a PDCP duplication field used to indicate whether PDCP duplication is configured, where when the PDCP duplication field appears, it means that an initial state of PDCP duplication is active; (2) RLC1 (for example, LCH1), RLC2 (for example, LCH2) or RLC3 (for example, LCH3) corresponding to a PDCP entity; and (3) a cell corresponding to each LCH, which is only configured in a CA scenario.

In prior art, under two-legs duplication in both CA and DC scenarios, the activation/deactivation of the MAC CE is 8 D-fields, that is, 1 byte. As shown in Table 1, Di indicates an activated state or a deactivated state of a DRB i configured with PDCP duplication in RLC entities associated with a same MAC entity, and i is the DRBs configured with PDCP duplication arranged in an ascending order of DRB ID. Specifically, Di may be 1 or 0, where when Di is equal to 1, it means to activate PDCP duplication function of DRB i; and when Di is equal to 0, it means to deactivate PDCP duplication function of DRB i.

TABLE 1

| D7 | D6 | D5 | D4 | D3 | D2 | D1 | D0 |
| --- | --- | --- | --- | --- | --- | --- | --- |

In prior art, PDCP duplication is configured at a granularity of RBs. In other words, once a RB is configured with PDCP duplication, all data packets in the RB will be duplicated when PDCP duplication of the RB is activated.

However, for some RB, data packets therein may have different degrees of importance. Specifically, a data packet with a higher degree of importance may have higher requirements for delay and reliability, and a duplication operation may be needed to ensure transmission performance of the data packet. In contrast, a data packet with a lower degree of importance may have lower requirements for delay and reliability, and a duplication operation may not be needed to ensure transmission performance of the data packet. In this case, it is a waste of resources to perform PDCP duplication operations on the data packet with a lower degree of importance.

For example, when a RB is a video service DRB, data packets corresponding to some video frames (such as video background data packets) have relatively lower requirements for delay and reliability, while data packets corresponding to some video frames (such as dynamic changes or key elements) have relatively higher requirements for delay and reliability. Or, when a RB is a drone service DRB, two or more Quality of Service (QoS) flows with different QoS requirements may be mapped to a same DRB due to data synchronization, that is, the different QoS flows having different requirements for transmission performance such as delay and reliability may be mapped to the same DRB, resulting in data packets included in the same DRB having different degrees of importance.

In embodiments of the present disclosure, a PDCP duplication function determination method is provided, including: receiving a PDCP duplication function configuration information sent by a network, where the PDCP duplication function configuration information is obtained by determining, when an RB is configured with a PDCP duplication function, whether one or more data packets associated with each priority level are configured with the PDCP duplication function based on a number of priority levels of data packets of the RB; and determining, according to the PDCP duplication function configuration information, whether each data packet of the RB is configured with the PDCP duplication function. According to the embodiments of the present disclosure, the PDCP duplication function can be configured for the data packets according to the priority levels of the data packets in each RB, so that the granularity of the PDCP duplication function configuration is refined, which facilitates the network to effectively and flexibly configure the PDCP duplication function for the data packets based on the priority levels of the data packets.

Furthermore, according to the embodiments of the present disclosure, the PDCP duplication function determination method facilitates the network to configure the PDCP duplication function for certain data packets in the RB according to current transmission resources, wireless link transmission quality and other related factors, thereby improving utilization efficiency of transmission resources.

In order to clarify the object, characteristic and advantages of embodiments of the present disclosure, embodiments of present disclosure will be described clearly in detail in conjunction with accompanying drawings.

Figure 1:
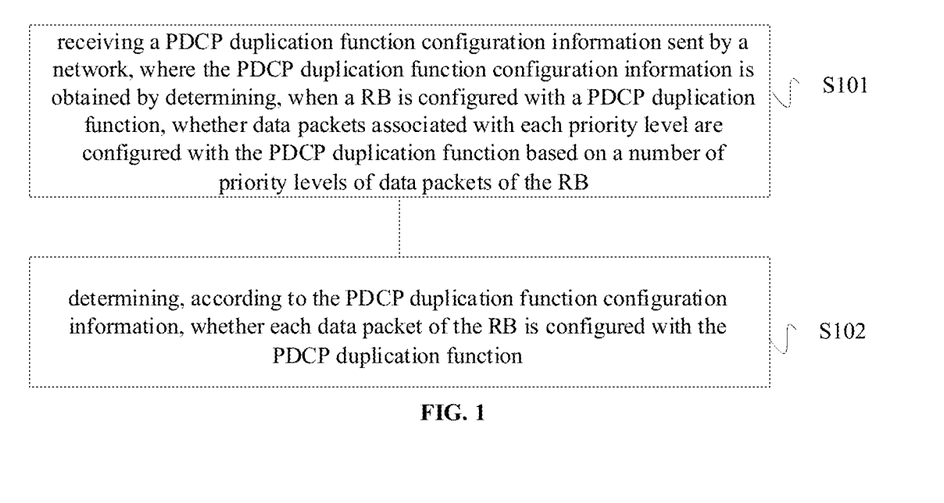
FIG. 1 schematically illustrates a flow chart of a PDCP duplication function determination method according to an embodiment.

FIG. 1 schematically illustrates a flow chart of a PDCP duplication function determination method according to an embodiment, where the PDCP duplication function determination method may be applied to a UE and may be performed by the UE.

In an embodiment of the present disclosure, the PDCP duplication function determination method includes S101 and S102.

In S101, a PDCP duplication function configuration information sent by a network is received, where the PDCP duplication function configuration information is obtained by determining, when an RB is configured with a PDCP duplication function, whether one or more data packets of each priority level are configured with the PDCP duplication function based on a number of priority levels of data packets of the RB.

In S102, according to the PDCP duplication function configuration information, whether each data packet of the RB is configured with the PDCP duplication function is determined.

In some embodiments, in S101, a base station at the network side (for example, a NR gNB) may firstly determine whether the PDCP duplication function is configured for the RB. If the PDCP duplication function is configured for the Rb, priority levels of the data packets of the RB and numbers of the data packets of each priority level are determined. For example, if the RB has N data packets, in which N1 data packets have a first priority level, N2 data packets have a second priority level, and N3 data packets have a third priority level, where N=N1+N2+N3, and N, N1, N2 and N3 are positive integers. Secondly, the base station may determine to configure the PDCP duplication function for data packets associated with which priority level or levels, so as to obtain the PDCP duplication function configuration information.

Thereafter, the base station may send the PDCP duplication function configuration information to the UE, where the PDCP duplication function configuration information may be sent through a RRC message, a MAC CE or a physical layer message, which are not described in detail here and should not limit protection scope of the present disclosure.

After the UE receives the PDCP duplication function configuration information sent by the base station, the UE can determine, from the PDCP duplication function configuration information, whether the one or more data packets associated with each priority level are configured with the PDCP duplication function or not.

In some embodiments, the UE may determine the priority level of each data packet of the RB.

In some embodiments, the UE may determine the priority level of each data packet according to a QoS flow identifier (ID) of the data packet. Specifically, the UE and the base station may determine in advance different QoS flow IDs corresponding to different priority levels. In a specific embodiment, the priority levels may be determined according to an ascending order or a descending order of the QoS flow IDs. For example, the smaller the QoS flow ID, the higher the priority level; or, the greater the QoS flow ID, the higher the priority level.

In some embodiments, the UE may classify the data packets of each RB based on the QoS flow IDs. For example, data packets with a same QoS flow ID in the RB may be classified into a same priority level. Or, if there are N types of QoS flow IDs for the data packets in the RB, data packets of the RB may be classified into N priority levels.

In some embodiments, the UE may determine the priority levels of the data packets according to an indication from an upper layer of the data packets. Specifically, the upper layer of the data packets may be at least one of an application layer and an Internet Protocol (IP) layer. The application layer may include a layer corresponding to a transmission control protocol (TCP), a user datagram protocol (UDP), a hypertext transfer protocol, a file transfer protocol, a remote login protocol, a simple mail transfer protocol, a domain name resolution protocol, a simple file transfer protocol, a simple network management protocol or a dynamic host configuration protocol.

Specifically, when the UE determines the priority levels of the data packets according to the indication from the upper layer of the data packets, the upper layer may indicate importance levels or priority levels of the data packets in a following way. For example, each data packet may be marked with an importance level mark or a priority level mark. In another example, the importance levels or priority levels of the data packets may be indicated explicitly according to a part of a head information of the upper layer, or may be indicated implicitly according to the part of the head information of the upper layer.

In some embodiments, if the PDCP duplication function configuration information uses a bitmap to indicate whether the data packets associated with each priority level are configured with the PDCP duplication function, after determining a priority level of each data packet of the RB, whether the data packet is configured with the PDCP duplication function may be determined according to the priority level of the data packet.

In some embodiments, when a PDCP duplication field indicates that the RB is configured with the PDCP duplication function, the base station may use a bitmap to indicate whether data packets of each priority level are configured with the PDCP duplication function or not.

Specifically, each priority level of the RB corresponds to 1 bit in the bitmap, which indicates whether the data packets of the priority level is configured with the PDCP duplication function or not. For example, 0 means that a corresponding priority level is not configured with the PDCP duplication function, and 1 means that a corresponding priority level is configured with the PDCP duplication function. For an activation/deactivation command, 0 means to deactivate the PDCP duplication function, and 1 means to activate the PDCP duplication function.

As shown in Table 2, data packets of a certain RB are classified into 3 priority levels, where a bit value of a first priority level is 1 and a bit value of a second priority level is 1, respectively, which indicates that data packets associated with the first and second priority levels are configured with the PDCP duplication function; and a bit value of a third priority level is 0, which indicates that data packets associated with the third priority are not configured with the PDCP duplication function.

TABLE 2

| | Priority level | | |
|---|---|---|---|
| | 1 | 2 | 3 |
| Bit value | 1 | 1 | 0 |

In some embodiments, the PDCP duplication function configuration information may be used to indicate a number of priority levels of data packets configured with the PDCP duplication function. When the PDCP duplication function configuration information indicates the number of priority levels of data packets configured with the PDCP duplication function, after determining priority levels of all data packets of the RB, the UE may determine priority levels of data packets configured with the PDCP duplication function, and determine whether each data packet is configured with the PDCP duplication function according to the priority levels and the number of priority levels of data packets configured with the PDCP duplication function.

In an embodiment, as shown in Table 3, priority levels are 1, 2, and 3, and 2 bits are used to indicate the number of priority levels configured with the PDCP duplication function. When the number of priority levels configured with the PDCP duplication function is 3, data packets of first three priority levels are configured with PDCP duplication function; when the number of priority levels configured with the PDCP duplication function is 2, data packets of first two priority levels are configured with PDCP duplication function; when the number of priority levels configured with the PDCP duplication function is 1, data packets of first one priority level are configured with PDCP duplication function; when the number of priority levels configured with the PDCP duplication function is 0, none of the data packets is configured with PDCP duplication function.

TABLE 3

| | A number of priority levels | | | |
|---|---|---|---|---|
| | 3 | 2 | 1 | 0 |
| Bit value | 1 1 | 1 0 | 0 1 | 0 0 |

In some embodiments, the PDCP duplication function configuration information may use a bitmap to indicate at least one leg used by data packets associated with each priority level. Specifically, after determining a priority level of each data packet of the RB, the UE may determine whether a data packet is configured with the PDCP duplication function according to the priority level of the data packet and a number of legs used by the data packet associated with the priority level.

In some embodiments, when the number of legs indicated by the bitmap is 1, data packets associated with the priority level are not configured with the PDCP duplication function. When the number of legs indicated by the bitmap is at least two, data packets associated with the priority level are configured with the PDCP duplication function. Further, since the bitmap indicates the legs used by the data packets of each priority level, the UE can further determine the legs used by each data packet.

Specifically, as for multi-connection PDCP duplication scenarios, in which one RB is associated with at least two legs (for example, at least two LCH or RLC entities), which legs to use by data packets of each priority level may be indicated respectively. For example, if the RB is associated with M legs, a bitmap corresponding to each priority level has M bits. For each priority level, a corresponding bit corresponds to the legs, and a value of the corresponding bit indicates whether the corresponding legs are used for data transmission by the data packets of the priority level.

TABLE 4

| | Priority level | | | | | | | | |
|---|---|---|---|---|---|---|---|---|---|
| | 1 | | | 2 | | | 3 | | |
| LCH | LCH1 | LCH2 | LCH3 | LCH1 | LCH2 | LCH3 | LCH1 | LCH2 | LCH3 |
| Bit values | 1 | 1 | 1 | 0 | 1 | 1 | 0 | 1 | 0 |

As shown in Table 4, if M=3, a bit value of "0" indicates that a corresponding leg cannot perform data transmission, and a bit value of "1" indicates that the corresponding leg can perform data transmission. The priority levels of data packets of a certain RB are 1, 2, and 3, respectively, and LCHs associated with each priority level are LCH1, LCH2 or LCH3, which indicates that legs used by data packets associated with a first priority level are LCH1, LCH2 and LCH3, legs used by data packets associated with a second priority level are LCH2 and LCH3; legs used by data packets associated with a third priority level are LCH2. Since the data packets associated with the first priority level and the second priority level use at least two legs, the data packets associated with the first and second priority levels are configured with the PDCP duplication function; however, the data packets associated with the third priority level only use one leg, the data packets associated with the third priority level are not configured with the PDCP duplication function.

In some embodiments, the PDCP duplication function configuration information may indicate a number of legs used by data packets of each priority level. After determining a priority level of each data packet of the RB, the UE can determine whether the data packet is configured with the PDCP duplication function according to the priority level of the data packet and the number of legs used by data packets associated with the priority level. If the number of legs used by the data packets associated with the priority level is 1, the data packets associated with the priority level are not configured with the PDCP duplication function; if the number of legs used by the data packets associated with the priority level is two or more, the data packets associated with the priority level is configured with the PDCP duplication function. Specifically, the legs used by the data packets associated with the priority level are same as legs used by the data packets associated with the priority level configured with the PDCP duplication function.

In some embodiments, if priority levels of legs used for the PDCP duplication function corresponding to the RB are predetermined and a number of the legs used by data packets associated with a priority level is greater than or equal to 1, legs used by the data packets can be determined according to the priority level of the data packets, the number of the legs and the priority levels of the legs.

In some embodiments, if priority levels of legs used for the PDCP duplication function corresponding to the RB are predetermined and a number of the legs used by data packets associated with a priority level is greater than or equal to 1, the UE can determine legs used by the data packets according to the priority level of the data packets, the number of the legs and the priority levels of the legs.

For example, the number of the legs is 0, 1, 2 and 3. As shown in Table 5, two bits are used to indicate the number of legs that the UE can use. When the number of the legs is 3, data packets configured with the PDCP duplication function can use legs with first three priority levels; when the number of the legs is 2, data packets configured with the PDCP duplication function can use legs with first two priority levels; when the number of the legs is 1, data packets are not configured with the PDCP duplication function, and a leg with the priority level 1 can be used for data transmission; and when the number of the legs is 0, it may indicate reserved bits.

Those skilled in the art can understand that when a data packet is not configured with the PDCP duplication function, the data packet may use a preset leg which is determined in advance by the base station and the UE. In this case, the PDCP duplication function configuration information may indicate the number of legs used by data packets of each priority level. Still referring to Table 5, when the number of the legs is 3, data packets configured with the PDCP duplication function can use legs with first three priority levels and the preset leg; when the number of the legs is 2, data packets configured with the PDCP duplication function can use legs with first two priority levels and the preset leg; when the number of the legs is 1, data packets configured with the PDCP duplication function can use legs with first priority levels and the preset leg; and when the number of the legs is 0, data packets are not configured with the PDCP duplication function and can use the preset leg.

TABLE 5

| | The number of legs | | | |
|---|---|---|---|---|
| | 3 | 2 | 1 | 0 |
| Bit values | 1  1 | 1  0 | 0  1 | 0  0 |

In some embodiments, when a data packet is not configured with the PDCP duplication function, the data packet may use a preset leg which is determined in advance by the base station and the UE. When the data packet is configured with the PDCP duplication function, the UE may determine a number of legs used by the data packet of the RB according to a priority level of the data packet. For example, as shown in Table 6, when the priority level of the data packet is 1, first three legs can be used, and the bit value is "11"; when the priority level of the data packet is 2, first two legs can be used, and the bit value is "10"; when the priority level of the data packet is 3, a first leg can be used, and the bit value is "10"; and when the priority level of the data packet is 4, the preset leg can be used.

TABLE 6

| | Priority level of a data packet | | | |
|---|---|---|---|---|
| | 1 | 2 | 3 | 4 |
| Bit values | 1  1 | 1  0 | 0  1 | 0  0 |

Figure 2:
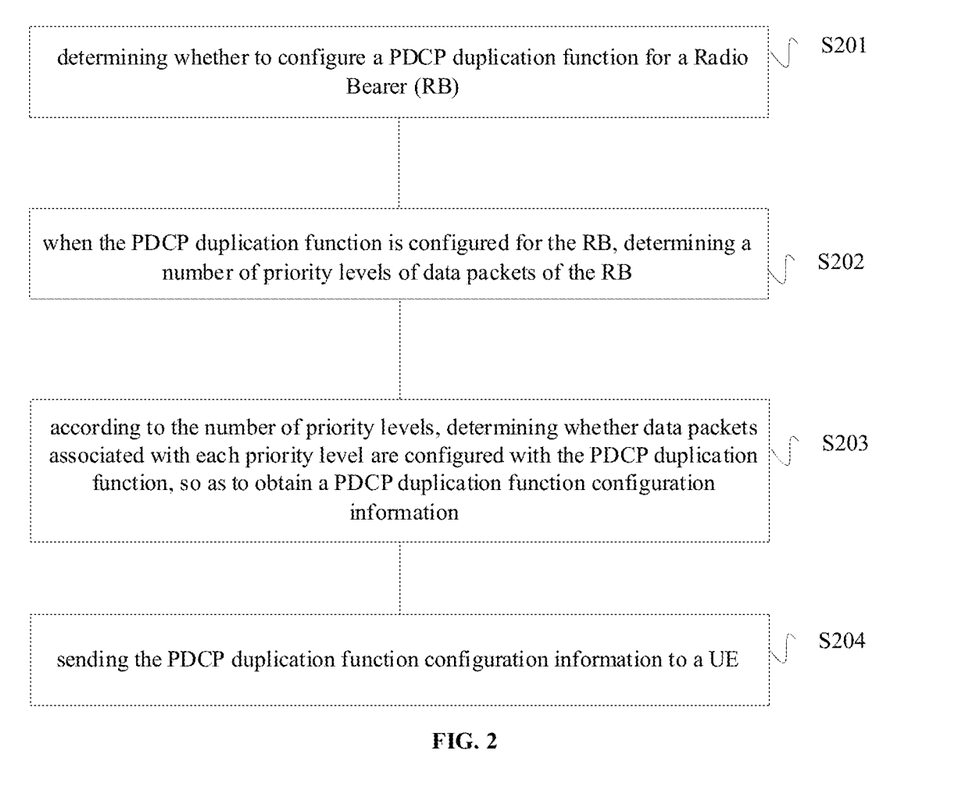
FIG. 2 schematically illustrates a flow chart of a PDCP duplication function indication method according to an embodiment.

FIG. 2 schematically illustrates a flow chart of a PDCP duplication function indication method according to an embodiment, which may be applied to a network, for example, may be performed by a base station. Referring to FIG. 2, the PDCP duplication function indication method includes S201 to S204.

In S201, whether to configure a PDCP duplication function for a RB is determined.

In S202, when the PDCP duplication function is configured for the RB, a number of priority levels of data packets of the RB is determined.

In S203, according to the number of priority levels, whether data packets associated with each priority level is configured with the PDCP duplication function is determined, and a PDCP duplication function configuration information is obtained.

In S204, the PDCP duplication function configuration information is sent to a UE.

Specifically, in S201, the base station on the network side may determine whether to configure the PDCP duplication function for the RB, so as to determine the PDCP duplication field.

In some embodiments, in S202, when the RB is configured with the PDCP duplication function, priority levels of data packets of the RB is determined, so as to obtain the number of priority levels, which facilitates the base station to determine to configure the PDCP duplication function for data packets associated with which priority level or levels.

In some embodiments, the base station may determine the priority levels of the data packets in the following ways: (1) Determine the priority levels of the data packets according to QoS flow IDs of the data packets; (2) Determine the priority levels of the data packets according to an indication from an upper layer of the data packets. Specifically, the base station may determine the priority levels of the data packets according to importance identifiers or priority level identifiers carried in the data packets, or according to a header information from the upper layer of the data packets.

In some embodiments, in S203, the base station may determine whether data packets associated with each priority level are configured with the PDCP duplication function, so as to obtain the PDCP duplication function configuration information.

In some embodiments, the PDCP duplication function configuration information may use a bitmap to indicate whether the data packets associated with each priority level are configured with the PDCP duplication function or not.

In some embodiments, when determining whether the data packets associated with each priority level are configured with the PDCP duplication function, PDCP duplication function indication method may further include: determining a configuration indication information, where the configuration indication information indicates a number of priority levels of the data packets configured with the PDCP duplication function, so that the user equipment may determine whether the data packets associated with each priority level is configured with the PDCP duplication function according to the number of priority levels, wherein the PDCP duplication function configuration information includes the configuration indication information. In this case, the PDCP duplication function configuration information may indicate whether the data packets associated with each priority level are configured with the PDCP duplication function by indicating the number of priority levels of the data packets configured with the PDCP duplication function.

In some embodiments, while determining whether the data packets associated with each priority level are configured with the PDCP duplication function, a leg indication information may also be determined, which indicates legs used by the data packets associated with each priority level, wherein the PDCP duplication function configuration information includes the leg indication information.

In some embodiments, priority levels of legs used for the PDCP duplication function corresponding to the RB are predetermined. When determining whether the data packets associated with each priority level are configured with the PDCP duplication function, a second leg indication information is determined, which indicates a number of legs used by the data packets associated with each priority level configured with the PDCP duplication function, so that the UE may determine the legs used by the data packets configured with the PDCP duplication function according to the number of legs, wherein the PDCP duplication function configuration information includes the second leg indication information.

In S204, the base station may send the PDCP duplication function configuration information to the UE.

Those skilled in the art can understand that S201 to S204 can be regarded as execution steps that correspond to S101 to S102 described in the embodiments in conjunction with FIG. 1, and the two are complementary to each other in terms of detailed implementation and principles. Therefore, principles, detailed implementation and advantages of the method of S201 to S204 can be found in the related descriptions of the method shown in FIG. 1, and are not described in detail here.

Figure 3:
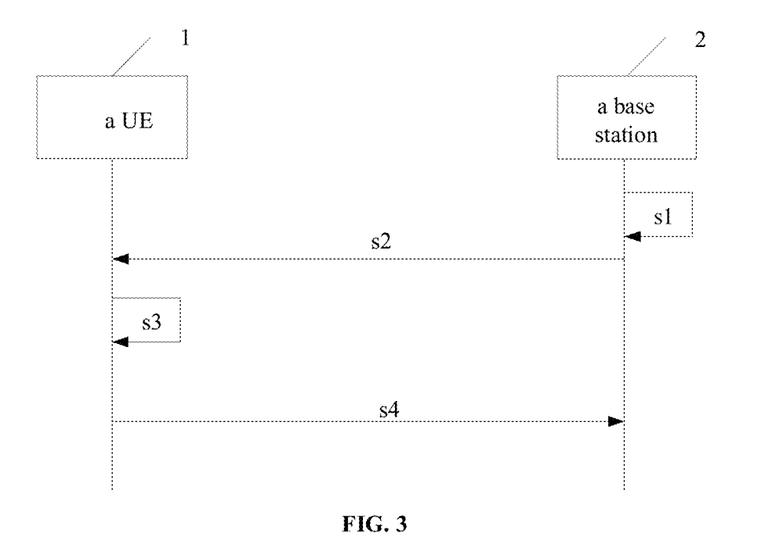
FIG. 3 is a schematic diagram of signaling interactions in a typical application scenario according to an embodiment.

Signaling interactions between the UE and the network (for example, a NR base station) according to the embodiments of the present disclosure will be further described in detail below in conjunction with typical application scenarios.

In a typical application scenario, referring to FIG. 3, after a UE 1 establishes a communication with a base station 2, the base station 2 may perform s1, that is, the base station 2 may determine whether a radio bearer is configured with a PDCP duplication function; and if the radio bearer is configured with the PDCP duplication function, priority levels of data packets carried by the radio bearer are determined, and which priority level or levels of the data packets are configured with the PDCP duplication function are determined according to the priority levels, so that the PDCP duplication function configuration information can be obtained.

Thereafter, the base station 2 may perform s2, that is, the base station 2 may send the PDCP duplication function configuration information to the UE 1.

After the UE 1 receives the PDCP duplication function configuration information, the UE 1 may perform s3, that is, the UE 1 determines if each data packet of the radio bearer is configured with the PDCP duplication function according to the PDCP duplication function configuration information.

In some embodiments, the UE 1 may duplicate each data packet according to the PDCP duplication function configuration information. If the PDCP duplication function configuration information also includes a leg indication information (for example, a leg indication information that is used to indicate a leg used by data packets associated with each priority level or to indicate a number of legs used by data packets configured with the PDCP duplication function associated with each priority level), the UE 1 may further determines legs used for PDCP duplication.

Further, after the UE 1 is configured with the PDCP duplication function, s4 may be performed, in which the UE 1 may perform PDCP duplication and send data through multiple legs.

Principles and detailed implementation of the UE 1 and the base station 2 in the application scenario shown in FIG.

3 can be found in the above descriptions of the methods as shown in FIG. 1 and FIG. 2, and are not described in detail here.

Therefore, according to the embodiments of the present disclosure, the PDCP duplication function can be configured for the data packets according to the priority levels of the data packets in each RB, so that the granularity of the PDCP duplication function configuration is refined, which facilitates the network to effectively and flexibly configure the PDCP duplication function for the data packets based on the priority levels of the data packets, thereby improving utilization efficiency of transmission resources.

Figure 4:
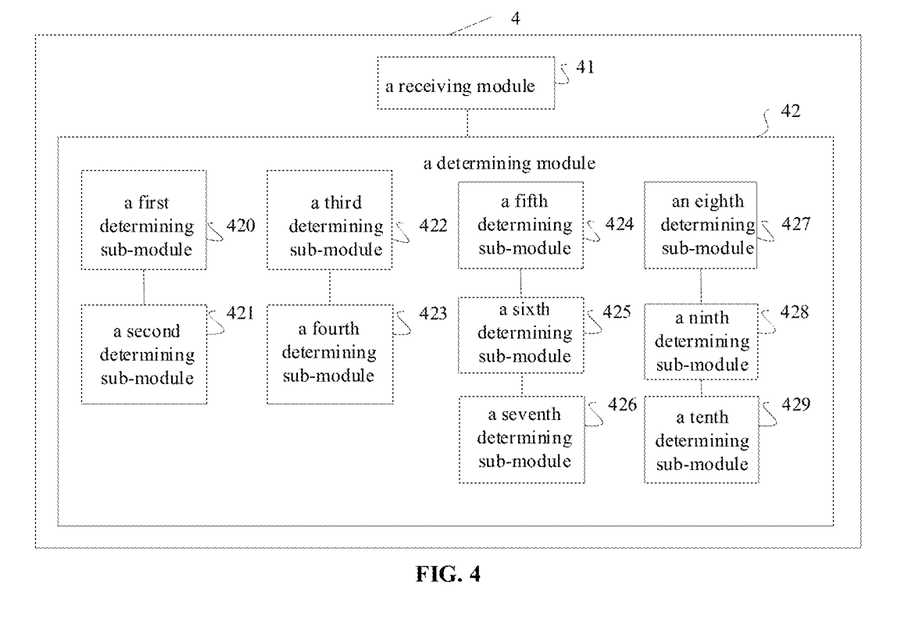
FIG. 4 schematically illustrates a structural diagram of a PDCP duplication function determination device according to an embodiment.

FIG. 4 schematically illustrates a structural diagram of a PDCP duplication function determination device according to an embodiment. A PDCP duplication function determination device 4 (hereinafter referred to as the determination device 4) may be applied a UE, for example, may be executed by the UE. Those skilled in the art can understand that the determination device 4 described in embodiments of the present disclosure can be used to implement the PDCP duplication function determination method as shown in FIG. 1 and FIG. 3.

In some embodiments, the determination device 4 includes a receiving module 41 and a determining module 42.

In some embodiments, the receiving module 41 is adapted to receive a PDCP duplication function configuration information sent by a network, where the PDCP duplication function configuration information is obtained by determining, when an RB is configured with a PDCP duplication function, whether data packets associated with each priority level are configured with the PDCP duplication function based on a number of priority levels of data packets of the RB. And the determining module 42 is adapted to determine whether each data packet of the RB is configured with the PDCP duplication function according to the PDCP duplication function configuration information.

In some embodiments, the base station may determine the priority levels of the data packets in the following ways: (1) Determine the priority levels of the data packets according to QoS flow IDs of the data packets; (2) Determine the priority levels of the data packets according to an indication from an upper layer of the data packets.

Specifically, the base station may determine the priority levels of the data packets according to importance identifiers or priority level identifiers carried in the data packets, or according to a header information from the upper layer of the data packets.

In some embodiments, the determining module 42 includes: a first determining sub-module 420, adapted to determine the priority level of each data packet of the RB; and a second determining sub-module 421, adapted to, when the PDCP duplication function configuration information uses a bitmap to indicate whether data packets associated with each priority level are configured with the PDCP duplication function, determine whether each data packet is configured with the PDCP duplication function according to the priority level of the data packet.

In some embodiments, the determining module 42 includes: a third determining sub-module 422, adapted to determine the priority level of each data packet of the RB; a fourth determining sub-module 423, adapted to, when the PDCP duplication function configuration information indicates a number of priority levels of data packets configured with the PDCP duplication function, determine whether each data packet is configured with the PDCP duplication function according to the priority level of the data packet and the number of priority levels.

In some embodiments, the determining module 42 includes: a fifth determining sub-module 424, adapted to determine the priority level of each data packet of the RB; a sixth determining sub-module 425, adapted to, when the PDCP duplication function configuration information uses a bitmap to indicate at least one leg used by data packets associated with each priority level, determine whether each data packet is configured with the PDCP duplication function according to the priority level of the data packet and the at least one leg used by the data packets associated with the priority level.

In some embodiments, while determining whether each data packet is configured with the PDCP duplication function according to the priority level of the data packet and the at least one leg used by the data packets associated with the priority level, the determining module 42 includes: a seventh determining sub-module 426, adapted to, when a number of the at least one leg used by the data packets associated with the priority level is greater than or equal to 1, determine a leg used by the data packet according to the priority level of the data packet and the at least one leg used by the data packets associated with the priority level.

In some embodiments, the determining module 42 includes: a eighth determining sub-module 427, adapted to determine the priority level of each data packet of the RB; a ninth determining sub-module 428, adapted to, when the PDCP duplication function configuration information indicates a number of legs used by data packets of each priority level configured with the PDCP duplication function, determine whether each data packet is configured with the PDCP duplication function according to the priority level of the data packet and the number of legs.

In some embodiments, priority levels of legs used for the PDCP duplication function corresponding to the RB are predetermined, and while determining whether each data packet is configured with the PDCP duplication function according to the priority level of the data packet and the number of legs, the determining module 42 further includes: a tenth determining sub-module 429, adapted to, when the number of legs used by the data packets associated with the priority level is greater than or equal to 1, determine whether each data packet is configured with the PDCP duplication function according to the priority level of the data packet, the number of legs and the priority levels of legs.

Principles, detailed implementation and advantages of the determination device 4 can be found in the above descriptions of the method as shown in FIG. 1, and are not described here.

Figure 5:
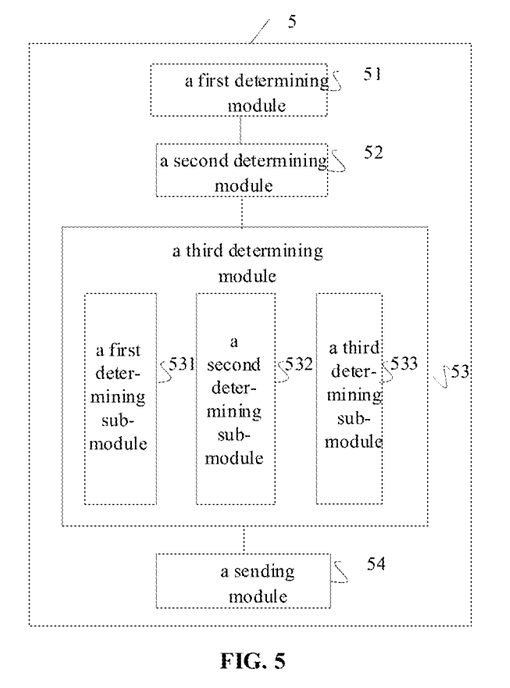
FIG. 5 schematically illustrates a structural diagram of a PDCP duplication function indication device according to an embodiment.

FIG. 5 schematically illustrates a structural diagram of a PDCP duplication function indication device according to an embodiment. A PDCP duplication function indication device 5 (hereafter referred to as the indication device 5) may be applied to a network side, for example, a base station. Those skilled in the art can understand that the indication device 5 provided in embodiments of the present disclosure may be used to execute the PDCP duplication function indication method as shown in FIG. 2 and FIG. 3.

In some embodiments, the indication device 5 includes a first determining module 51, a second determining module 52, a third determining module 53, and a sending module 54.

In some embodiments, the first determining module 51 is adapted to determine whether to configure a PDCP duplication function for a RB; the second determining module 52 is adapted to, when the PDCP duplication function is configured for the RB, determine a number of priority levels of data packets of the RB; the third determining module 53 is adapted to, according to the number of priority levels, determine whether data packets associated with each priority level are configured with the PDCP duplication function, so as to obtain a PDCP duplication function configuration information; and the sending module 54 is adapted to send the PDCP duplication function configuration information to a UE.

In some embodiments, the priority levels of the data packets are determined in a following way: determining the priority levels of the data packets according to QoS flow IDs of the data packets; or determining the priority levels of the data packets according to an indication from an upper layer of the data packets.

In some embodiments, determining the priority levels of the data packets according to an indication from an upper layer of the data packets includes: determining the priority levels of the data packets according to importance identifiers or priority level identifiers carried in the data packets, or according to a header information from the upper layer of the data packets.

In some embodiments, the PDCP duplication function configuration information uses a bitmap to indicate whether data packets associated with each priority level are configured with the PDCP duplication function.

In some embodiments, when a data packet is not configured with the PDCP duplication function, the data packet may use a preset leg which is determined in advance by the base station and the UE. When the data packet is configured with the PDCP duplication function, the UE may determine a number of legs used by the data packet of the RB according to a priority level of the data packet. For example, as shown in Table 6, when the priority level of the data packet is 1, first three legs can be used, and the bit value is "11"; when the priority level of the data packet is 2, first two legs can be used, and the bit value is "10"; when the priority level of the data packet is 3, a first leg can be used, and the bit value is "10"; and when the priority level of the data packet is 4, the preset leg can be used.

TABLE 6

| Priority level of a data packet | | | | | | | |
|---|---|---|---|---|---|---|---|
| 1 | | 2 | | 3 | | 4 | |
| Bit values | 1 | 1 | 1 | 0 | 0 | 1 | 0 | 0 |

In some embodiments, while determining whether data packets associated with each priority level are configured with the PDCP duplication function, the third determining module 53 may further include: a first determining sub-module 531 adapted to determine a leg indication information, where the leg indication information indicates legs used by the data packets configured with the PDCP duplication function associated with each priority level, where the PDCP duplication function configuration information includes the leg indication information.

In some embodiments, priority levels of legs used for the PDCP duplication function corresponding to the RB are predetermined, and while determining whether data packets associated with each priority level are configured with the PDCP duplication function, the third determining module 53 may further include: a second determining sub-module 532 adapted to determine a leg indication information, wherein the leg indication information indicates a number of legs used by the data packets associated with each priority level configured with the PDCP duplication function, so that the UE determines legs used by the data packets configured with the PDCP duplication function according to the number of legs and the priority levels of legs, wherein the PDCP duplication function configuration information includes the leg indication information.

In some embodiments, while determining whether data packets associated with each priority level are configured with the PDCP duplication function, the third determining module 53 may further include: a third determining sub-module 533 adapted to determine a configuration indication information, wherein the configuration indication information indicates a number of priority levels of the data packets configured with the PDCP duplication function, so that the UE determines whether the data packets associated with each priority level are configured with the PDCP duplication function according to the number of priority levels, where the PDCP duplication function configuration information includes the configuration indication information.

Principles, detailed implementation and advantages of the indication device 5 can be found in the above descriptions of the method as shown in FIG. 2 and FIG. 3, and are not described here.

In an embodiment of the present disclosure, a storage medium having computer instructions stored therein is provided, wherein when the computer instructions are executed, the above method as shown in FIG. 1 to FIG. 3 is performed. The storage medium may be a computer readable storage medium, for example, including a non-volatile or non-transitory memory, an optical disk, a mechanical disk, a solid disk or the like.

In an embodiment of the present disclosure, a terminal including a memory and a processor is provided, wherein the memory has computer instructions stored therein, and when the processor executes the computer instructions, the above method as shown in FIG. 1 to FIG. 3 is performed. Optionally, the terminal may be a user equipment (UE).

In an embodiment of the present disclosure, a base station including a memory and a processor is provided, wherein the memory has computer instructions stored therein, and when the processor executes the computer instructions, the above method as shown in FIG. 2 and FIG. 3 is performed. Optionally, the base station may be an NR base station.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A Packet Data Convergence Protocol (PDCP) duplication function determination method, comprising:
   receiving a PDCP duplication function configuration information sent by a network, where the PDCP duplication function configuration information is obtained by determining whether data packets associated with each priority level of data packets of a Radio Bearer (RB) are configured with a PDCP duplication function based on a number of priority levels of the data packets of the RB in a case that the RB is configured with the PDCP duplication function; and
   determining, according to the PDCP duplication function configuration information, whether each data packet of the RB is configured with the PDCP duplication function;

wherein said determining whether each data packet of the RB is configured with the PDCP duplication function according to the PDCP duplication function configuration information comprises:
  determining a priority level of each data packet of the RB; and
  in response to the PDCP duplication function configuration information using a bitmap to indicate whether data packets associated with each priority level are configured with the PDCP duplication function, determining whether each data packet is configured with the PDCP duplication function according to the priority level of the data packet.

2. The PDCP duplication function determination method according to claim 1, wherein the priority levels of the data packets are determined in a following way:
  determining the priority levels of the data packets according to Quality of Service (QoS) flow identifiers (IDs) of the data packets; or
  determining the priority levels of the data packets according to an indication from an upper layer of the data packets.

3. The PDCP duplication function determination method according to claim 2, wherein determining the priority levels of the data packets according to an indication from an upper layer of the data packets comprises:
  determining the priority levels of the data packets according to importance identifiers or priority level identifiers carried in the data packets, or according to a header information of the upper layer of the data packets.

4. The PDCP duplication function determination method according to claim 1, wherein said determining whether each data packet of the RB is configured with the PDCP duplication function according to the PDCP duplication function configuration information further comprises:
  in response to the PDCP duplication function configuration information indicating a number of priority levels of data packets configured with the PDCP duplication function, determining whether each data packet is configured with the PDCP duplication function according to the priority level of the data packet and the number of priority levels.

5. The PDCP duplication function determination method according to claim 1, wherein said determining whether each data packet of the RB is configured with the PDCP duplication function according to the PDCP duplication function configuration information further comprises:
  in response to the PDCP duplication function configuration information using a bitmap to indicate at least one leg used by data packets associated with each priority level, determining whether each data packet is configured with the PDCP duplication function according to the priority level of the data packet and the at least one leg used by the data packets associated with the priority level.

6. The PDCP duplication function determination method according to claim 5, wherein said determining whether each data packet is configured with the PDCP duplication function according to the priority level of the data packet and the at least one leg used by the data packets associated with the priority level comprises:
  in response to a number of the at least one leg used by the data packets associated with the priority level being greater than or equal to 1, determining a leg used by the data packet according to the priority level of the data packet and the at least one leg used by the data packets associated with the priority level.

7. The PDCP duplication function determination method according to claim 1, wherein said determining whether each data packet of the RB is configured with the PDCP duplication function according to the PDCP duplication function configuration information further comprises:
  in response to the PDCP duplication function configuration information indicating a number of legs used by data packets of each priority level configured with the PDCP duplication function, determining whether each data packet is configured with the PDCP duplication function according to the priority level of the data packet and the number of legs.

8. The PDCP duplication function determination method according to claim 7, wherein priority levels of legs used for the PDCP duplication function corresponding to the RB are predetermined, and said determining whether each data packet is configured with the PDCP duplication function according to the priority level of the data packet and the number of legs comprises:
  in response to the number of legs used by the data packets associated with the priority level being greater than or equal to 1, determining whether each data packet is configured with the PDCP duplication function according to the priority level of the data packet, the number of legs and the priority levels of legs.

9. A non-transitory storage medium having computer instructions stored therein, wherein once the computer instructions are executed, the method according to claim 1 is performed.

10. A terminal comprising a memory and a processor is provided, wherein the memory has computer instructions stored therein, and when the processor executes the computer instructions, the method according to claim 1 is performed.

11. A Packet Data Convergence Protocol (PDCP) duplication function indication method, comprising:
  determining whether to configure a PDCP duplication function for a Radio Bearer (RB);
  in response to the PDCP duplication function being configured for the RB, determining a number of priority levels of data packets of the RB;
  according to the number of priority levels, determining whether data packets associated with each priority level are configured with the PDCP duplication function, so as to obtain a PDCP duplication function configuration information; and
  sending the PDCP duplication function configuration information to a user equipment (UE).

12. The PDCP duplication function indication method according to claim 11, wherein the priority levels of the data packets are determined in a following way:
  determining the priority levels of the data packets according to Quality of Service (QoS) flow identifiers (IDs) of the data packets; or
  determining the priority levels of the data packets according to an indication from an upper layer of the data packets.

13. The PDCP duplication function indication method according to claim 12, wherein determining the priority levels of the data packets according to an indication from an upper layer of the data packets comprises:
  determining the priority levels of the data packets according to importance identifiers or priority level identifiers carried in the data packets, or according to a header information of the upper layer of the data packets.

14. A base station comprising a memory and a processor is provided, wherein the memory has computer instructions stored therein, and when the processor executes the computer instructions, the method according to claim 12 is performed.

15. The PDCP duplication function indication method according to claim 11, wherein the PDCP duplication function configuration information uses a bitmap to indicate whether data packets associated with each priority level are configured with the PDCP duplication function.

16. The PDCP duplication function indication method according to claim 11, while determining whether data packets associated with each priority level are configured with the PDCP duplication function, the PDCP duplication function indication method further comprises:
   determining a configuration indication information, wherein the configuration indication information indicates a number of priority levels of the data packets configured with the PDCP duplication function, so that the UE determines whether the data packets associated with each priority level are configured with the PDCP duplication function according to the number of priority levels, where the PDCP duplication function configuration information comprises the configuration indication information.

17. The PDCP duplication function indication method according to claim 11, while determining whether data packets associated with each priority level are configured with the PDCP duplication function, the PDCP duplication function indication method further comprises:
   determining a leg indication information, wherein the leg indication information indicates legs used by the data packets configured with the PDCP duplication function associated with each priority level, where the PDCP duplication function configuration information comprises the leg indication information.

18. The PDCP duplication function indication method according to claim 11, wherein priority levels of legs used for the PDCP duplication function corresponding to the RB are predetermined, and while determining whether data packets associated with each priority level are configured with the PDCP duplication function, the PDCP duplication function indication method further comprises:
   determining a leg indication information, wherein the leg indication information indicates a number of legs used by the data packets associated with each priority level configured with the PDCP duplication function, so that the UE determines legs used by the data packets configured with the PDCP duplication function according to the number of legs and the priority levels of legs, wherein the PDCP duplication function configuration information comprises the leg indication information.

19. A Packet Data Convergence Protocol (PDCP) duplication function determination device, comprising:
   a receiving circuitry, adapted to receive a PDCP duplication function configuration information sent by a network, where the PDCP duplication function configuration information is obtained by determining whether data packets associated with each priority level of data packets of a Radio Bearer (RB) are configured with a PDCP duplication function based on a number of priority levels of the data packets of the RB in a case that the RB is configured with the PDCP duplication function; and
   a determining circuitry, adapted to determine whether each data packet of the RB is configured with the PDCP duplication function according to the PDCP duplication function configuration information;
   wherein the determining circuitry is further adapted to:
      determine a priority level of each data packet of the RB; and
      in response to the PDCP duplication function configuration information using a bitmap to indicate whether data packets associated with each priority level are configured with the PDCP duplication function, determine whether each data packet is configured with the PDCP duplication function according to the priority level of the data packet.

* * * * *